(12) United States Patent
Jeong et al.

(10) Patent No.: US 8,370,492 B2
(45) Date of Patent: Feb. 5, 2013

(54) SYSTEM FOR PROVIDING QUALITY OF SERVICE IN LINK LAYER AND METHOD USING THE SAME

(75) Inventors: Hong Kyu Jeong, Yongin-si (KR); Hyun Surk Ryu, Suwon-si (KR); Fei Fei Feng, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1255 days.

(21) Appl. No.: 11/778,682

(22) Filed: Jul. 17, 2007

(65) Prior Publication Data

US 2008/0235699 A1    Sep. 25, 2008

(30) Foreign Application Priority Data

Mar. 23, 2007  (KR) ........................ 10-2007-0028814

(51) Int. Cl.
  *G06F 15/173*  (2006.01)
(52) U.S. Cl. ........ 709/226; 709/217; 709/228; 370/368; 370/401; 370/477; 718/104
(58) Field of Classification Search ................... 709/226, 709/217, 228; 370/368, 401, 477; 718/104
  See application file for complete search history.

(56) References Cited

U.S. PATENT DOCUMENTS

| | | | |
|---|---|---|---|
| 7,088,736 B2 * | 8/2006 | Altenbernd et al. | 370/468 |
| 7,289,453 B2 * | 10/2007 | Riedel et al. | 370/252 |
| 2005/0165899 A1 * | 7/2005 | Mazzola | 709/217 |
| 2008/0080473 A1 * | 4/2008 | Thubert et al. | 370/348 |

FOREIGN PATENT DOCUMENTS

| | | |
|---|---|---|
| KR | 10-2004-0093274 A | 11/2004 |
| KR | 10-2006-0011729 A | 2/2006 |
| KR | 10-2006-0022680 A | 3/2006 |
| KR | 10-2004-0046455 A | 7/2007 |
| WO | 01/89153 A2 | 11/2001 |

* cited by examiner

Primary Examiner — Kyung H Shin
(74) Attorney, Agent, or Firm — Sughrue Mion, PLLC

(57) ABSTRACT

A system and method of providing a quality of service (QoS) is provided. The method of providing the QoS in the link layer includes receiving, by a stream providing device, minimum and maximum resource requirement information of a stream receiving device; transmitting, by the stream providing device, a reservation message including the minimum and maximum resource requirement information; allocating a resource, by at least one bridge, based on the reservation message transmitted from the stream providing device; and receiving, by the stream receiving device, a stream transmitted from the stream providing device via the resource.

21 Claims, 9 Drawing Sheets

SYSTEM FOR PROVIDING QUALITY OF SERVICE IN LINK LAYER AND METHOD USING THE SAME

CROSS-REFERENCE TO RELATED APPLICATION

This application claims priority from Korean Patent Application No. 10-2007-0028814, filed on Mar. 23, 2007, in the Korean Intellectual Property Office, the entire disclosure of which is incorporated by reference in its entirety.

BACKGROUND OF THE INVENTION

1. Field of the Invention

Methods and apparatuses consistent with the present invention relate to a quality of service (QoS) and more particularly, to providing a QoS in a link layer which can provide the QoS for each stream in the link layer, and reduce reservation failure for a stream.

2. Description of Related Art

A stream receiving device performs a registration process in a stream providing device via a Stream Reservation Protocol (SRP) in order to receive a stream, and the stream providing device performs a reservation process via the SRP in order to provide the stream receiving device with the stream, in Institute of Electrical and Electronics Engineers (IEEE) 802.1.

Specifically, the stream providing device allocates a resource for providing the stream by each bridge, via a process of transmitting a reservation message to the stream receiving device, and provides the stream receiving device with the stream via an allocated resource.

A bridge transmits, to the stream receiving device, a notification message notifying of resource reservation failure when the resource for providing the stream is unallocable.

Specifically, when the resource reservation failure is generated in at least one of bridges which allocate the resource for the stream, the stream receiving device cannot receive the stream.

Accordingly, a method which may reduce a number of times a resource reservation failure is generated in a link layer, and provide a quality of service (QoS) for each stream is required.

SUMMARY OF THE INVENTION

An aspect of the present invention provides a system and method of providing a quality of service (QoS) in a link layer which can provide the QoS for each stream in order to provide a QoS of time-sensitive traffic in the link layer.

Another aspect of the present invention provides a system and method of providing a QoS in a link layer which can provide the QoS for each stream in the link layer and reduce a number of resource reservation failures which may be generated in a bridge.

Another aspect of the present invention provides a system and method of providing a QoS in a link layer which can flexibly update an allocation resource for a stream depending on allocable resource, reduce a number of resource reservation failures, and provide a stream of good quality.

Another aspect of the present invention provides a system and method of providing a QoS in a link layer which can secure an allocation resource for a stream intending to receive a portion of an allocation resource for a stream under service, and to perform a service.

According to another aspect of the present invention, there is provided a method of providing a QoS in a link layer, the method including: receiving, by a stream providing device, minimum and maximum resource requirement information of a stream receiving device; transmitting, by the stream providing device, a reservation message including the minimum and maximum resource requirement information; allocating a resource, by at least one bridge, based on the reservation message transmitted from the stream providing device; and receiving, by the stream receiving device, a stream transmitted from the stream providing device via the resource.

According to another aspect of the present invention, in the allocating the resource, bridges following any one of the at least one bridge allocate the resource to a minimum resource requirement when the any one of the at least one bridge allocates the resource to the minimum resource requirement, based on the reservation message.

According to another aspect of the present invention, the reservation message includes a field concerning whether the minimum resource requirement is allocated, and the bridges following the any one of the at least one bridge allocates the resource to the minimum resource requirement, based on the field concerning whether the minimum resource requirement is allocated.

According to another aspect of the present invention, a bridge which allocates the resource to a maximum resource requirement of the at least one bridge changes the resource from the maximum resource requirement to the minimum resource requirement, and allocates the resource.

According to another aspect of the present invention, a bridge which allocates the resource to the minimum resource requirement of the at least one bridge determines whether to allocate the resource to the maximum resource requirement at predetermined update intervals, changes the resource into the maximum resource requirement, and allocates the resource to the maximum resource requirement when allocation to the maximum resource requirement is possible.

According to another aspect of the present invention, each of the at least one bridge allocates the resource to the minimum resource requirement after changing a resource for another stream under service from a maximum resource requirement to a minimum resource requirement and allocating the resource for the other stream when an allocable resource is less than the minimum resource requirement.

According to another aspect of the present invention, the stream providing device receives a registration message transmitted from the stream receiving device, and receives the minimum and maximum resource requirement information via a minimum and maximum resource requirement information field additionally configured in the registration message.

According to another aspect of the present invention, the stream providing device receives the minimum and maximum resource requirement information via a layer application higher than the link layer.

According to another aspect of the present invention, the method further includes: receiving, by the stream providing device, allocation resource change information of the resource transmitted from the stream receiving device; and changing and allocating, by each of the at least one bridge, the resource, based on the allocation resource change information.

According to another aspect of the present invention, there is provided a system for providing a QoS in a link layer, the system including: a stream providing device which receives minimum and maximum resource requirement information of a stream receiving device, and transmits a reservation message including the minimum and maximum resource requirement information; and at least one bridge which allocates a resource, based on the reservation message so that the stream providing device may provide the stream receiving device with a stream.

BRIEF DESCRIPTION OF THE DRAWINGS

The above and other aspects of the present invention will become apparent and more readily appreciated from the following detailed description of certain exemplary embodiments of the invention, taken in conjunction with the accompanying drawings of which.

DETAILED DESCRIPTION OF EXEMPLARY EMBODIMENTS OF THE INVENTION

Figure 1:
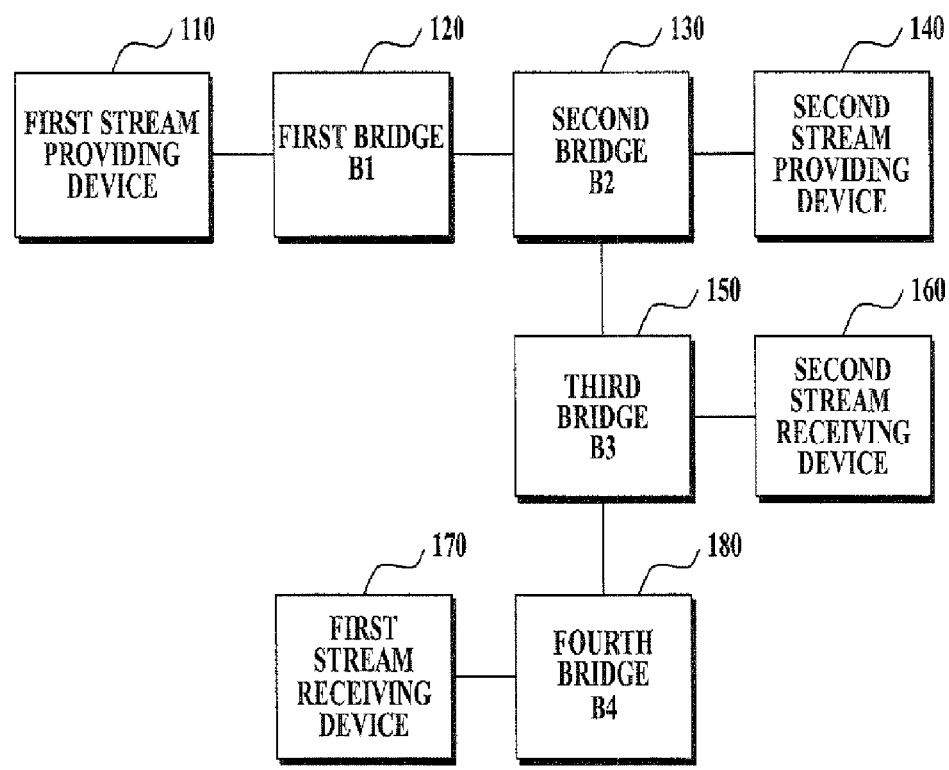
FIG. 1 is a block diagram illustrating a system which provides a quality of service (QoS) in a link layer according to an exemplary embodiment of the present invention.

Reference will now be made in detail to exemplary embodiments of the present invention, examples of which are illustrated in the accompanying drawings, wherein like reference numerals refer to the like elements throughout. The exemplary embodiments are described below in order to explain the present invention by referring to the figures.

FIG. 1 is a block diagram illustrating a system which provides a quality of service (QoS) in a link layer according to an exemplary embodiment of the present invention.

Here, a case where a resource for a stream between a first stream providing device and a first stream receiving device is allocated is described in FIG. 1.

Referring to FIG. 1, the system for providing the QoS includes a first stream providing device 110, a second stream providing device 140, a first stream receiving device 170, a second stream receiving device 160, and at least one of the first bridge B1 120, second bridge B2 130, third bridge B3 150, and fourth bridge B4 180.

The first stream providing device 110 and the second stream providing device 140 transmit a reservation message including minimum and maximum resource requirement information to bridges located between a stream providing device and a stream receiving device which requests a stream, and provide the stream receiving device with the stream via the at least one of the first bridge B1 120, second bridge B2 130, third bridge B3 150, and fourth bridge B4 180.

For example, when the first stream providing device 110 provides the first stream receiving device 170 with the stream, the first stream providing device 110 sequentially transmits the reservation message to the first bridge B1 120 through the fourth bridge B4 180, and provides the first stream receiving device 170 with the stream via the resource allocated by the first bridge B1 120 through the fourth bridge B4 180.

In this instance, the first stream providing device 110 may receive the minimum and maximum resource requirement information of the first stream receiving device 170 via an application of a layer higher than the link layer corresponding to a layer 2 level. Specifically, since the minimum and maximum resource requirement information is received from the application of the layer higher than the link layer, it is unnecessary to additionally configure a field for the minimum resource requirement information and the maximum resource requirement information in a message transmitted from the stream receiving device to the stream providing device, for example, a registration message.

In this instance, the first stream providing device 110 may receive the registration message transmitted from the first stream receiving device 170, and receive the minimum and maximum resource requirement information via a minimum resource requirement information field and a maximum resource requirement information field additionally configured in the registration message. Here, an example of a registration message structure is described with reference to FIG. 2 as follows.

Figure 2:
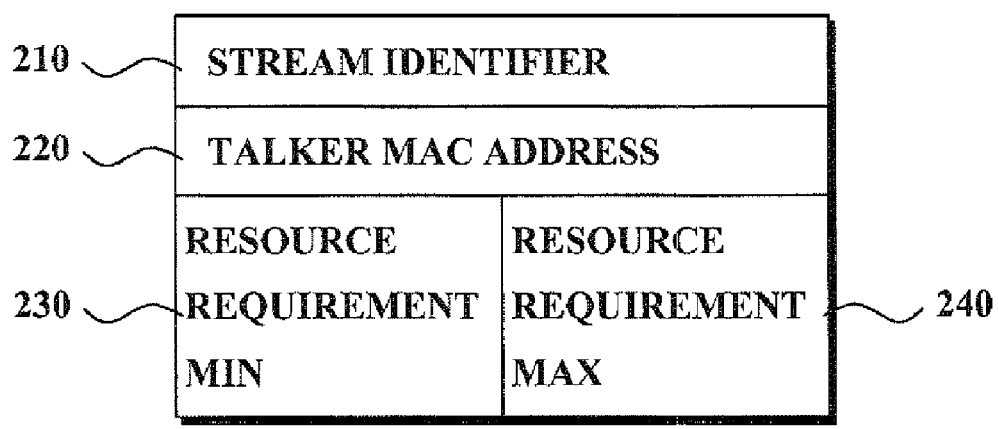
FIG. 2 is a diagram illustrating a registration message structure transmitted from a stream receiving device according to an exemplary embodiment of the present invention.

FIG. 2 is a diagram illustrating a registration message structure transmitted from a stream receiving device according to an exemplary embodiment of the present invention.

Referring to FIG. 2, a registration message includes a stream identifier field 210, a talker Media Access Control (MAC) address field 220, a resource requirement min field 230, and a resource requirement max field 240.

The stream identifier field 210 is a field for distinguishing one stream from another stream, as the field including stream identifier information.

The talker MAC address field 220 is a field including MAC address information of a stream providing device which provides a stream receiving device with a stream, as the field including the MAC address information of the stream providing device corresponding to a talker.

The resource requirement min field 230 is a field including minimum resource requirement information intended to be allocated, as the field including the minimum resource requirement information for the stream of the stream receiving device.

The resource requirement max field 240 is a field including maximum resource requirement information intended to be allocated, as the field including the maximum resource requirement information for the stream of the stream receiving device.

Specifically, the first stream providing device 110 receives the minimum resource requirement information and the maximum resource requirement information via a minimum resource requirement information field and a maximum resource requirement information field of the registration message transmitted from the first stream receiving device 170, for example, the resource requirement min field 230 and the resource requirement max field 240 of FIG. 2.

The at least one of the first bridge B1 120, second bridge B2 130, third bridge B3 150, and fourth bridge B4 180 allocate a resource for the stream requested by the first stream receiving device 170 to either a minimum resource requirement or a maximum resource requirement, based on the reservation message transmitted from the first stream providing device 110. For example, after the first bridge B1 120 receives the reservation message transmitted from the first stream providing device 110, the first bridge B1 120 allocates the resource to the maximum resource requirement when the first bridge B1 120 can allocate the resource for the stream of the first stream receiving device 170 to the maximum resource requirement, based on the minimum resource requirement information field and the maximum resource requirement information field additionally configured in the reservation message. Also, the first bridge B1 120 transmits the reservation message to the second bridge B2 130.

Conversely, when the second bridge B2 130 allocates the resource for the stream of the first stream receiving device 170, based on the reservation message, the second bridge B2 130 allocates the resource for the stream of the first stream receiving device 170 to the minimum resource requirement, in a case where the resource is less than the maximum resource requirement included in the reservation message, and the resource is allocable to the minimum resource requirement, for example, a case where the resource allocable by other streams under service is less than the maximum resource requirement.

Here, since the second bridge B2 130 allocates the resource to the minimum resource requirement, the first stream receiving device 170 receives the stream via the minimum resource requirement.

In this instance, the second bridge B2 130 transmits, to the first bridge B1 120, a predetermined message requesting to change the resource to the minimum resource requirement, and enables the first bridge B1 120 to change the resource for the stream from the maximum resource requirement to the minimum resource requirement.

In this instance, since the second bridge B2 130 allocates the resource for the stream of the first stream receiving device 170 to the minimum resource requirement, the second bridge B2 130 may establish information that the minimum resource requirement is allocated in a field concerning whether the minimum resource requirement additionally configured in the reservation message is allocated, and transmit the information to the third bridge B3 150. Specifically, since the third bridge B3 150 and the fourth bridge B4 180 establish the resource for the stream of the first stream receiving device 170 to the minimum resource requirement via an establishment value of the field concerning whether the minimum resource requirement additionally configured in the reservation message transmitted from the second bridge B2 130 is allocated, it is unnecessary to retrieve the maximum resource requirement information field.

Here, an example of a reservation message structure is described with reference to FIG. 3 as follows.

Figure 3:
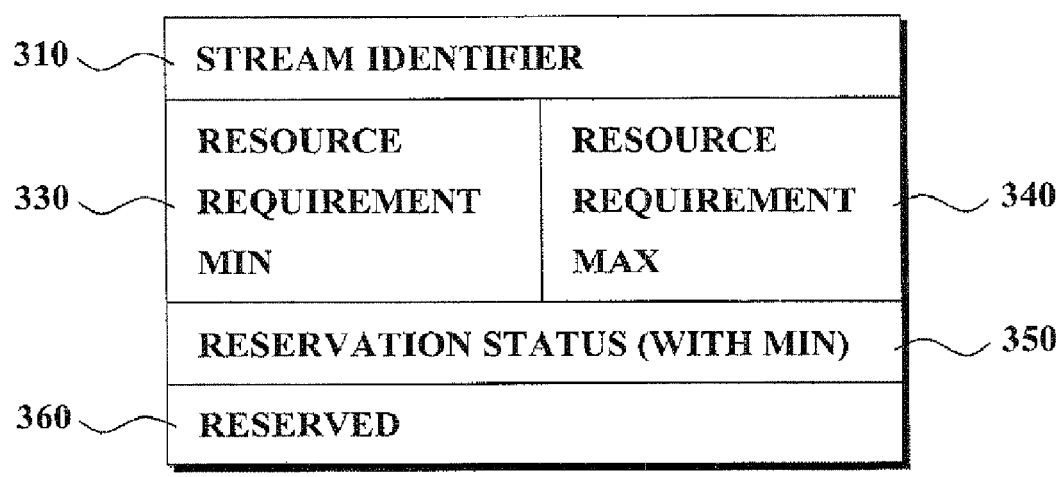
FIG. 3 is a diagram illustrating a reservation message structure transmitted from a stream providing device according to an exemplary embodiment of the present invention.

FIG. 3 is a diagram illustrating a reservation message structure transmitted from a stream providing device according to an exemplary embodiment of the present invention.

Referring to FIG. 3, the reservation message includes a stream identifier field 310, a resource requirement min field 330, a resource requirement max field 340, a reservation status field 350, and a reserved field 360.

The stream identifier field 310 is a field for distinguishing one stream from another stream, as the field including stream identifier information.

The resource requirement min field 330 is a field including minimum resource requirement information intended to be allocated, as the field including the minimum resource requirement information for the stream of the stream receiving device.

The resource requirement max field 340 is a field including maximum resource requirement information intended to be allocated, as the field including the maximum resource requirement information for the stream of the stream receiving device.

The reservation status (with MIN) field 350 is a field which determines whether a previous bridge allocates the resource for the stream to the minimum resource requirement, as a field which determines whether to allocate the resource for the stream of the stream receiving device to the minimum resource requirement. For example, a bridge receives the reservation message and checks the reservation status (with MIN) field 350 of the reservation message. Also, when the reservation status (with MIN) field 350 is established as "OK", the bridge checks only the resource requirement min field without being required to checking the resource requirement max field, allocates the resource for the stream of the stream receiving device to the minimum resource requirement, establishes a field value as "OK", and transmits the field value to a next bridge.

Also, when the resource for the stream of the stream receiving device is allocated to a maximum resource requirement, a value may be not established in the reservation status (with MIN) field 350, or the information that the maximum resource requirement is established may be established.

The reserved field 360 is a field which defines a corresponding field as a specific field, and uses the corresponding field, as a predetermined reservation field.

Specifically, after each of the at least one of the first bridge B1 120, second bridge B2 130, third bridge B3 150, and fourth bridge B4 180 first checks the reservation status (with MIN) field additionally configured in the reservation message transmitted from the first stream providing device 110, each of the at least one of the first bridge B1 120, second bridge B2 130, third bridge B3 150, and fourth bridge B4 180 checks the resource requirement min field and/or the resource requirement max field, based on a reservation status (with MIN) field value, and allocates the resource for the stream to either the minimum resource requirement or the maximum resource requirement.

Also, each of the at least one of the first bridge B1 120, second bridge B2 130, third bridge B3 150, and fourth bridge B4 180 changes an allocation resource for another stream under service, and allocates the resource of the first stream receiving device 170 to the minimum resource requirement when the resource for the stream requested by the first stream receiving device 170 is unallocable to the minimum resource requirement, for example, when a resource allocable by other streams under service is less than the minimum resource requirement.

For example, the third bridge B3 150 allocates the resource for the stream of the second stream receiving device 160 to the maximum resource requirement. Also, after the third bridge B3 150 changes the allocation resource of the second stream receiving device 160 from the maximum resource requirement to the minimum resource requirement, and allocates the resource when the resource allocable in a state of being under service is less than the minimum resource requirement of the first stream receiving device 170, the third bridge B3 150 allocates the resource for the stream of the first stream receiving device 170 to the minimum resource requirement. Here, the minimum resource requirement of the first stream receiving device 170 and the minimum resource requirement of the second stream receiving device 160 may be identical or different.

In this instance, each of the at least one of the first bridge B1 120, second bridge B2 130, third bridge B3 150, and fourth bridge B4 180 may update a time-sensitive resource at predetermined update intervals, and change the allocation resource. For example, each of the at least one of the first bridge B1 120, second bridge B2 130, third bridge B3 150, and fourth bridge B4 180 changes the resource for the stream from the minimum resource requirement to the maximum resource requirement, and allocates the resource when allocation to the maximum resource requirement for the stream under service via the minimum resource requirement is possible.

The first stream receiving device 170 receives the stream transmitted from the first stream providing device 110 via the resource allocated by the first bridge B1 120 through the fourth bridge B4 180.

Here, the first stream receiving device 170 is provided with the stream via the minimum resource requirement when at least one of the first bridge B1 120 through the fourth bridge B4 180 allocates the resource to the minimum resource requirement.

In this instance, since the first stream receiving device 170 is provided with the stream via the minimum resource requirement, unnecessary resource waste may be generated in a case of a bridge which allocates the resource to the maximum resource requirement. Accordingly, the first stream receiving device 170 transmits, to the bridges, the registration message requesting to change the resource for the stream from the maximum resource requirement to the minimum resource requirement in order to prevent unnecessary resource waste.

For example, after the first stream receiving device 170 additionally configures a field including information requesting allocation resource change in the registration message, and inputs, in the additionally configured field, allocation resource information to change, the first stream receiving device 170 transmits the allocation resource information to the first stream providing device 110 and the at least one of the first bridge B1 120, second bridge B2 130, third bridge B3 150, and fourth bridge B4 180, and enables each of the first stream providing device 110 and the at least one of the first bridge B1 120, second bridge B2 130, third bridge B3 150, and fourth bridge B4 180 to check whether allocation resource change is possible.

Specifically, a bridge which allocates the resource to the maximum resource requirement receives the registration message including allocation resource change information, changes the resource for the stream from the maximum resource requirement to the minimum resource requirement when the change information corresponds to change to the minimum resource requirement, and allocates the resource.

Conversely, when the change information corresponds to change to the maximum resource requirement, a bridge which allocates the resource to the minimum resource requirement determines whether allocation to the maximum resource requirement is possible after receiving the registration message, changes the resource for the stream from the minimum resource requirement to the maximum resource requirement, and allocates the resource when allocation to the maximum resource requirement is possible.

Here, an example of a registration message structure including the allocation resource change information is described with reference to FIG. 4 as follows.

Figure 4:
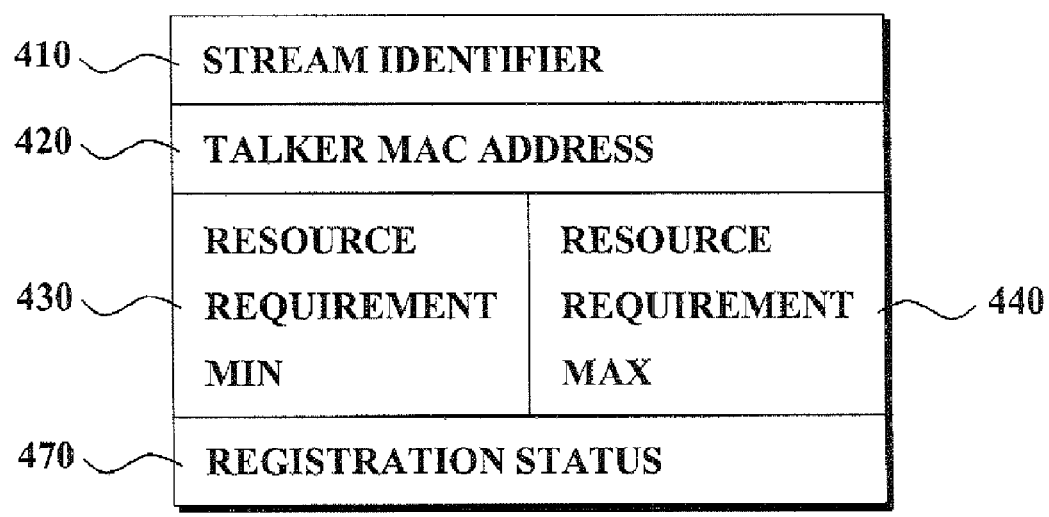
FIG. 4 is a diagram illustrating a registration message structure transmitted from a stream receiving device according to another exemplary embodiment of the present invention.

FIG. 4 is a diagram illustrating a registration message structure transmitted from a stream receiving device according to another exemplary embodiment of the present invention.

Referring to FIG. 4, it is understood that a registration status field 470 is added to the registration message structure of FIG. 2, in a registration message.

Specifically, the registration message includes a stream identifier field 410, a talker MAC address field 420, a resource requirement min field 430, a resource requirement max field 440, and the registration status field 470.

The stream identifier field 410 is a field for distinguishing one stream from another stream, as the field including stream identifier information.

The talker MAC address field 420 is a field including MAC address information of a first stream providing device which provides a first stream receiving device with a stream, as the field including the MAC address information of the stream providing device corresponding to a talker.

The resource requirement min field 430 is a field including minimum resource requirement information intended to be allocated, as the field including the minimum resource requirement information for the stream of the stream receiving device.

The resource requirement max field 440 is a field including maximum resource requirement information intended to be allocated, as the field including the maximum resource requirement information for the stream of the stream receiving device.

The registration status field 470 may check whether the first stream providing device 110 and bridges 120, 130, 150, and 180 may change the resource for the stream to either the minimum resource requirement or the maximum resource requirement via a registration status field value, as a field which intends to change an allocation resource.

For example, when it is intended to check whether the first stream receiving device 170 may change the allocation resource for the stream from the minimum resource requirement to the maximum resource requirement, the first stream receiving device 170 establishes the registration status field 470 value as "Increase", and transmits the value to the first stream providing device 110 and the at least one of the first bridge B1 120, second bridge B2 130, third bridge B3 150, and fourth bridge B4 180. Also, when it is intended to check whether the first stream receiving device 170 may change the allocation resource for the stream from the maximum resource requirement to the minimum resource requirement, the first stream receiving device 170 establishes the registration status field 470 value as "Decrease", and transmits the value to the first stream providing device 110 and the at least one of the first bridge B1 120, second bridge B2 130, third bridge B3 150, and fourth bridge B4 180.

In this instance, a case where the registration status field 410 value is established as "Decrease" may be used for a case where the resource for the stream is allocated to the minimum resource requirement via the reservation message transmitted to the first stream receiving device 170, and a case where the allocation resource of the bridges which allocates the resource to the maximum resource requirement is intended to be changed to the minimum resource requirement.

As described above, since the system for providing the QoS in the link layer according to the present exemplary embodiment of the present invention provides each stream with the QoS, in a time-sensitive traffic, a number of times a failure is generated with respect to resource reservation may be reduced.

Figure 5:
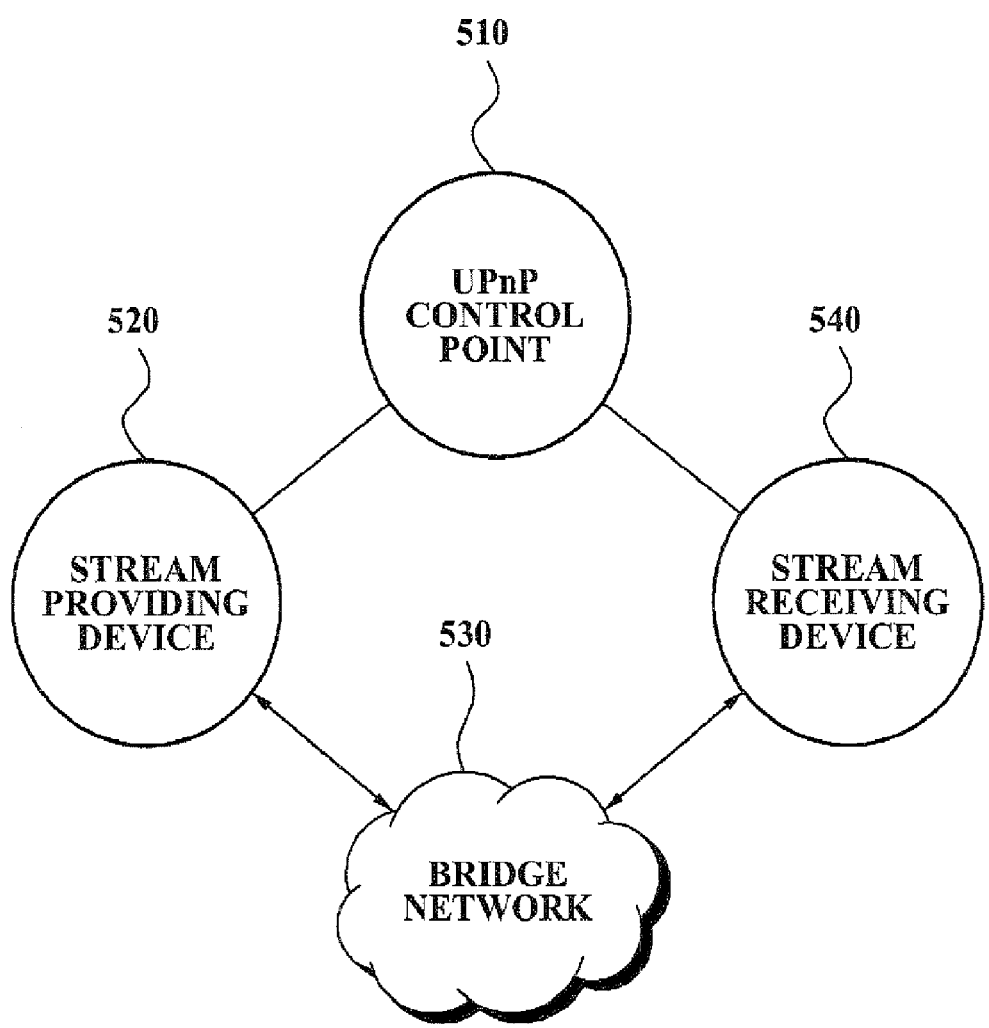
FIG. 5 is a diagram illustrating a system for providing a QoS in a link layer according to an exemplary embodiment applied to Universal Plug and Play (UPnP)

FIG. 5 is a diagram illustrating a case where a system for providing a QoS in a link layer according to an exemplary embodiment of the present invention is applied to Universal Plug and Play (UPnP).

Referring to FIG. 5, the system for providing the QoS in the link layer applied to UPnP includes a UPnP control point 510, a stream providing device 520, a bridge network 530, and a stream receiving device 540.

The UPnP control point 510 is connected via an interlockable program in order to interlock with the stream providing device 520 and the stream receiving device 540. When the UPnP control point 510 is connected with the stream providing device 520 and the stream receiving device 540, the stream providing device 520 and the stream receiving device 540 allocate the resource for the stream by using operations of FIGS. 6 through 8, and provide the QoS.

The stream providing device 520, the bridge network 530, and the stream receiving device 540 are in accordance with configurations of FIG. 1.

Specifically, the stream providing device 520 transmits, to the bridge network 530, a reservation message including minimum resource requirement information and maximum resource requirement information, and transmits the stream to the stream receiving device 540 when the resource is allocated by bridges configured in the bridge network 530.

The bridges configured in the bridge network 530 allocate minimum resource requirement and maximum resource requirement, based on the minimum resource requirement information, the maximum resource requirement information, and a reservation status field value, and enable a stream receiving device to be provided with a stream transmitted from a stream providing device.

As described in FIG. 5, the system for providing the QoS in the link layer according to the present exemplary embodiment of the present invention may interlock with UPnP, and ensure an unbroken connection.

Figure 6:
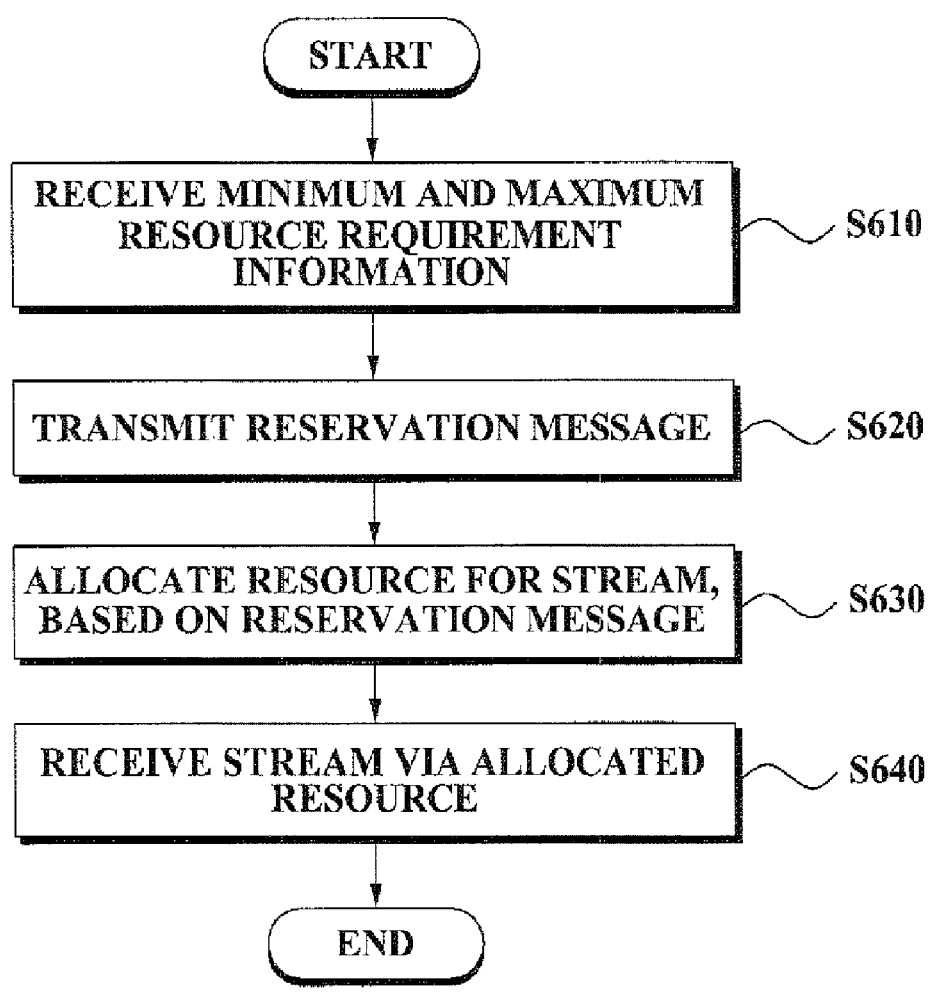
FIG. 6 is a flowchart illustrating a method of providing a QoS in a link layer according to an exemplary embodiment of the present invention.

FIG. 6 is a flowchart illustrating a method of providing a QoS in a link layer according to an exemplary embodiment of the present invention.

Referring to FIG. 6, a stream providing device receives minimum and maximum resource requirement information of a stream receiving device in operation S610, in the method of providing the QoS in the link layer.

In this instance, the stream providing device receives the minimum and maximum resource requirement information of the stream receiving device via an application of a layer higher than the link layer.

In this instance, the stream providing device receives the minimum and maximum resource requirement information of the stream receiving device via a minimum resource requirement information field and a maximum resource requirement information field additionally configured in the registration message transmitted from the stream receiving device.

The stream providing device generates a reservation message including the received minimum and maximum resource requirement information, and transmits the generated reservation message to bridges, in operation S620.

In this instance, the reservation message may include the minimum resource requirement information field and the maximum resource requirement information field, similar to the example of FIG. 2.

Each of the bridges allocates a resource of the stream providing device, based on the reservation message transmitted from the stream providing device, or a reservation message transmitted from an antecedent bridge, in operation S630.

Specifically, a bridge allocates the resource to either a minimum resource requirement or a maximum resource requirement, based on a minimum resource requirement information field value or a maximum resource requirement information field value included in the reservation message. For example, when the bridge can allocate the resource to the maximum resource requirement, the bridge allocates the resource for the stream to the maximum resource requirement, and when the bridge cannot allocate the resource to the maximum resource requirement, the bridge allocates the resource for the stream to the minimum resource requirement. As described above, the stream receiving device is provided with the stream transmitted from the stream providing device via the minimum resource requirement when any one of the bridges allocates the resource for the stream to the minimum resource requirement.

In this instance, when any one of the bridges allocates the resource for the stream to the minimum resource requirement, bridges configured following the any one of the bridges also allocate the resource for the stream to the minimum resource requirement. Specifically, when an initial bridge, which allocates the resource to the minimum resource requirement, establishes information that the minimum resource requirement is allocated in a field concerning whether the minimum resource requirement additionally configured in the reservation message is allocated, for example, "OK", and transmits the reservation message to a next bridge, the next bridge allocates the resource for the stream to the minimum resource requirement information field value, that is, the minimum resource requirement by using information that the minimum resource requirement is allocated.

In this instance, the reservation message includes the minimum resource requirement information field, the maximum resource requirement information field, and the field concerning whether the minimum resource requirement is allocated, the field corresponding to the reservation status field, similar to the example of FIG. 3.

In this instance, when the minimum resource requirement for the stream requested by the stream receiving device is unallocable, each bridge may allocate the resource for the stream of the stream receiving device to the minimum resource requirement after changing an allocation resource of another stream under service and sufficiently securing the resource.

In this instance, each bridge may determine whether the resource for the stream is changeable to the maximum resource requirement at predetermined intervals. When it is determined that the resource is changeable to the maximum resource requirement, each bridge may change the resource for the stream from the minimum resource requirement to the maximum resource requirement.

When each bridge allocates the resource for the stream, the stream receiving device receives a stream transmitted from the stream providing device via the allocated resource, in operation S640.

In this instance, when the stream receiving device is provided with the stream via the minimum resource requirement, the stream receiving device may request that the stream providing device and the bridges should change the resource to the minimum resource requirement via the registration message in order to prevent unnecessary resource waste in the bridge. Specifically, the stream providing device and the bridges receive the registration message with respect to a change request to the minimum resource requirement, and change the allocation resource to the minimum resource requirement when the resource for the stream is allocated to the maximum resource requirement.

In this instance, the registration message may include a change information field for the allocation resource, similar to the example of FIG. 4.

Also, when the change information corresponds to change in the maximum resource requirement, a bridge which allocates the resource to the minimum resource requirement determines whether allocation to the maximum resource requirement is possible after receiving the registration message, and changes the resource from the minimum resource requirement to the maximum resource requirement when allocation to the maximum resource requirement is possible.

Figure 7:
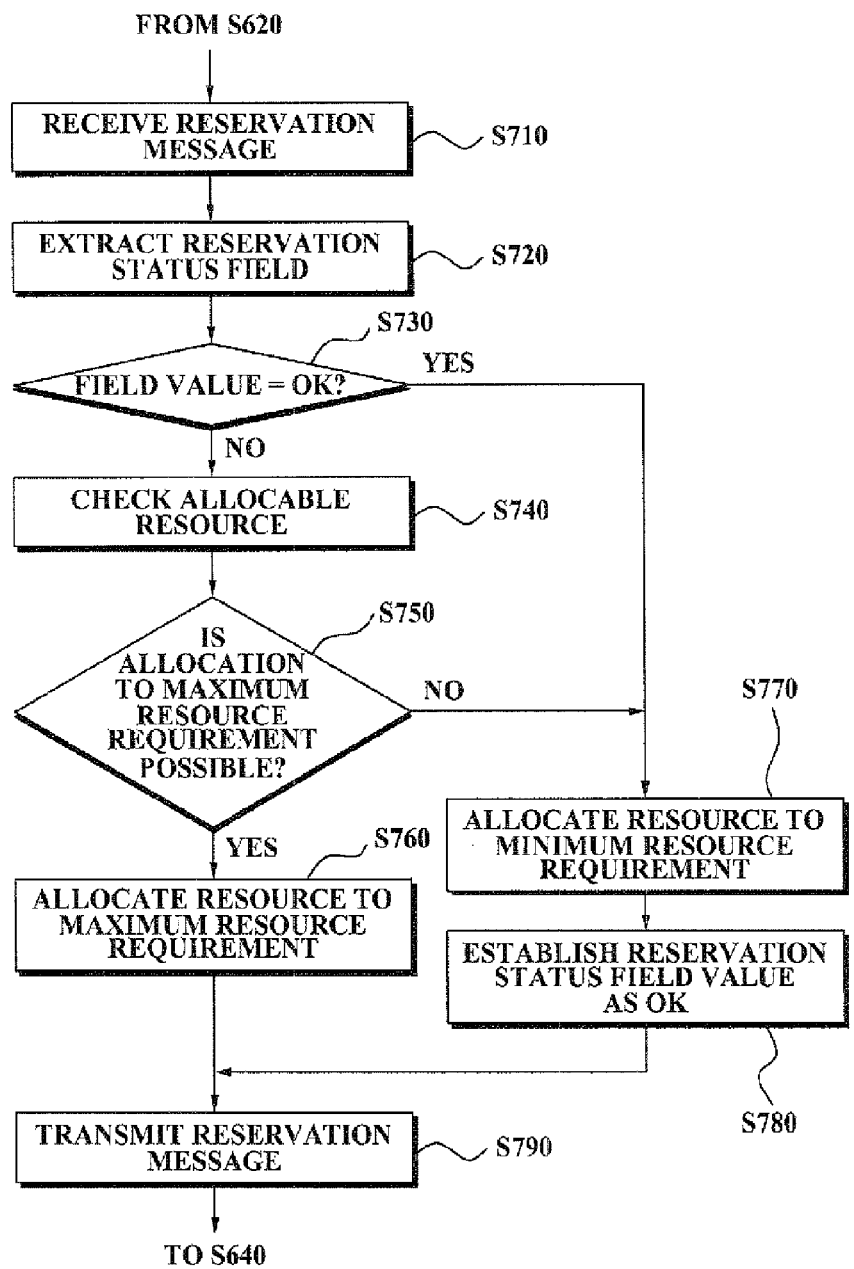
FIG. 7 is a flowchart illustrating a method of allocating a resource of a stream providing device according to an exemplary embodiment of the present invention.

FIG. 7 is a flowchart illustrating an example of allocating a resource of a stream providing device according to operation S630 of FIG. 6.

Here, FIG. 7 is flowchart illustrating resource allocation via a reservation status field additionally configured in a reservation message.

Referring to FIG. 7, the allocating, by the bridges, of the resource for the stream receives a reservation message transmitted from either a stream providing device or a antecedent bridge, in operation S710, and extracts a field concerning whether the minimum resource requirement is allocated, the field being additionally configured in the reservation message, for example, a reservation status field, in operation S720.

Whether an extracted reservation status field value corresponds to information that the minimum resource requirement is allocated, for example, "OK" is determined, in operation S730, and when the field value is "OK", the resource for the stream is allocated to the minimum resource requirement without a need for detecting a maximum resource requirement information field value, based on a minimum resource requirement information field value, in operation S770.

When the resource is allocated to the minimum resource requirement, the reservation status field value of the reservation message is established as "OK", in operation S780, and the reservation message is transmitted to either a next bridge or a stream receiving device, in operation S790.

Conversely, when it is determined that the extracted reservation status field value is different from "OK" in operation S730, an allocable resource is checked in operation S740. A maximum resource requirement information field is detected, and whether allocation to the maximum resource requirement is possible is determined in operation S750.

When it is determined that allocation to the maximum resource requirement is possible in operation S750, the resource for the stream is allocated to the maximum resource requirement in operation S760, and the reservation message is transmitted to either the next bridge or the stream receiving device in operation S790. Here, the reservation status field value of the reservation message may be different from "OK".

Conversely, when it is determined that allocation to the maximum resource requirement is impossible in operation S750, the resource for the stream is allocated to the minimum resource requirement in operation S770, and the reservation status field value of the reservation message is established as "OK" in operation S780. Also, the reservation message is transmitted to either the next bridge or the stream receiving device, in operation S790.

Specifically, FIG. 7 illustrates a process of allocating the resource to either the minimum resource requirement or the maximum resource requirement after determining whether the minimum resource requirement is established, based on the reservation status field value additionally configured in the reservation message.

Figure 8:
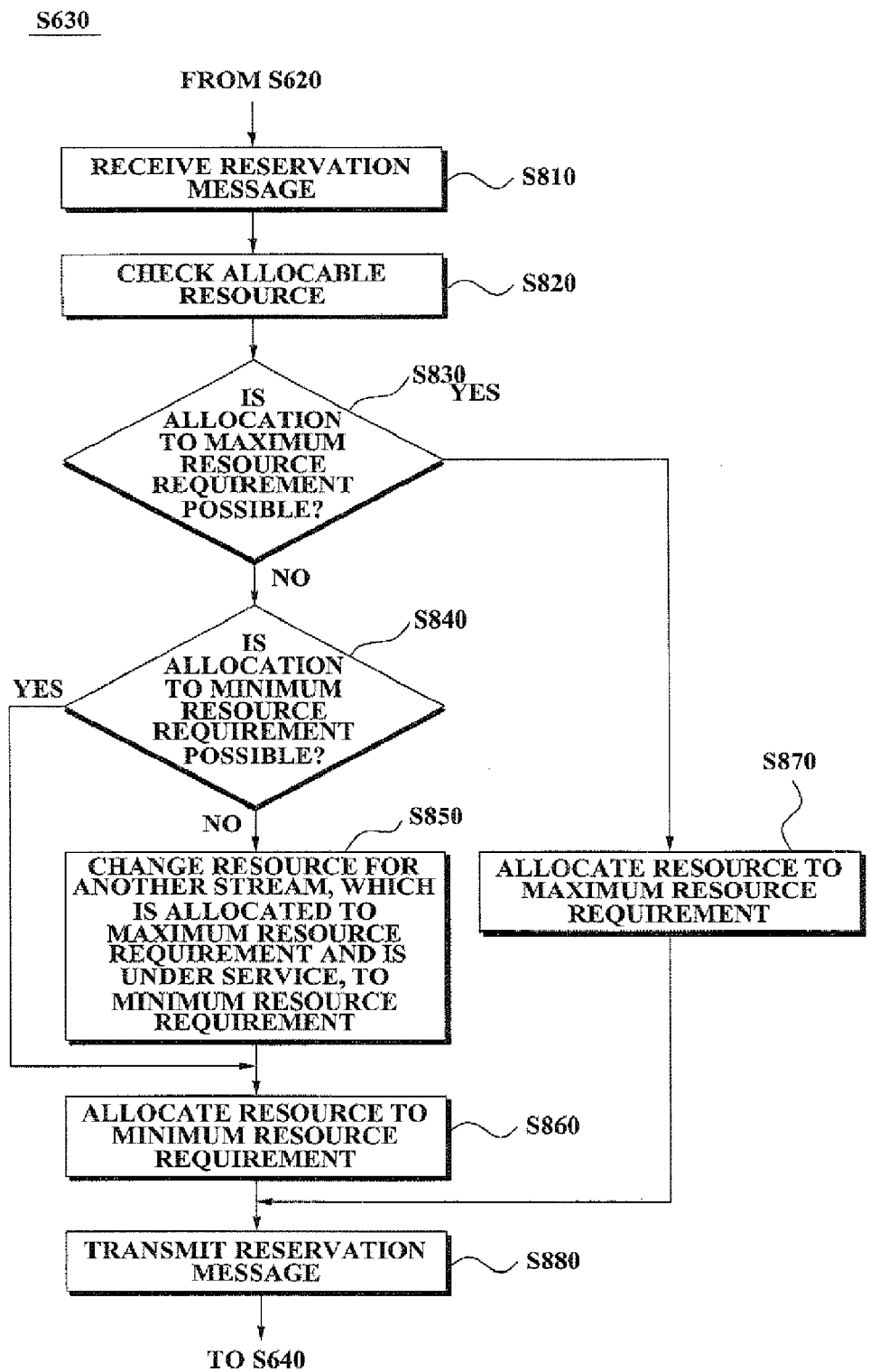
FIG. 8 is a flowchart illustrating a method of allocating a resource of a stream providing device according to another exemplary embodiment of the present invention.

FIG. 8 is a flowchart illustrating another example of allocating a resource of a stream providing device according to operation S630 of FIG. 6.

Here, FIG. 8 is an exemplary diagram of a process of allocating a resource to a minimum resource requirement by using allocation resource change for another stream under service when allocation to the minimum resource requirement is impossible.

Referring to FIG. 8, the allocating, by the bridges, of the resource for the stream receives a reservation message transmitted from either a stream providing device or a antecedent bridge, in operation S810, and checks a resource allocable as the resource for the stream, in operation S820.

Whether allocation to maximum resource requirement is possible is determined, based on a maximum resource requirement information field value additionally configured in the received reservation message, and the allocable resource, in operation S830.

When it is determined that allocation to the maximum resource requirement is possible in operation S830, the resource for the stream is allocated to the maximum resource requirement in operation S870, and the reservation message is transmitted to either a next bridge or a stream receiving device in operation S880.

Conversely, when it is determined that the allocable resource is less than the maximum resource requirement in operation S830, whether the allocable resource is greater than the minimum resource requirement is determined in operation S840.

When it is determined that the allocable resource is greater than the minimum resource requirement in operation S840, the resource for the stream is allocated to the minimum resource requirement in operation S860, and the reservation message is transmitted to either the next bridge or the stream receiving device in operation S880.

Conversely, when it is determined that the allocable resource is less than the minimum resource requirement in operation S840, an allocation resource for a stream allocated to the maximum resource requirement from among streams under service is changed to the minimum resource requirement, and the allocable resource is secured, in operation S850. Also, the resource for the stream of the stream receiving device is allocated to the minimum resource requirement by using a secured resource, in operation S860.

When the resource for the stream of the stream receiving device is allocated to the minimum resource requirement, the reservation message is transmitted to either the next bridge or the stream receiving device in operation S880.

Figure 9:
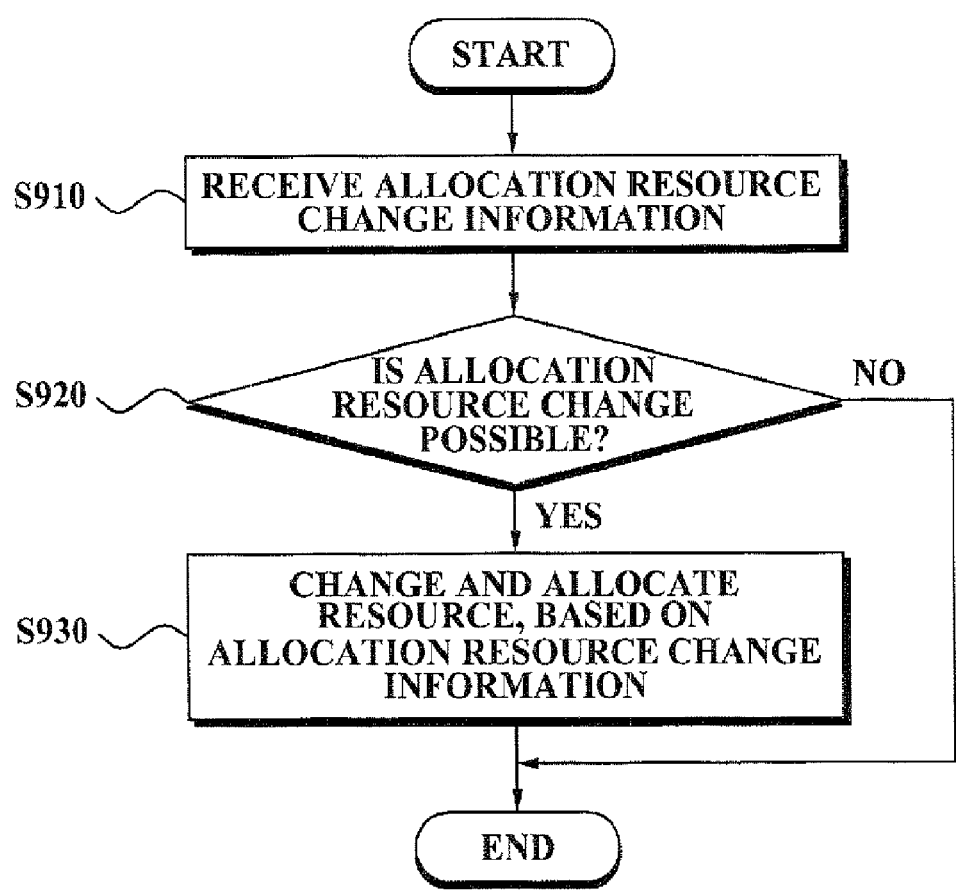
FIG. 9 is a flowchart illustrating a process of changing an allocation resource according to an exemplary embodiment of the present invention.

FIG. 9 is a flowchart illustrating a process of changing an allocation resource according to an exemplary embodiment of the present invention.

Referring to FIG. 9, a bridge receives information requesting allocation resource change, in operation S910.

In this instance, the bridge receives a registration message transmitted from a stream receiving device, and receives the information requesting the allocation resource change via an allocation resource change information field additionally configured in the registration message.

The bridge determines whether the allocation resource change is required, and checks whether the allocation resource change is possible when the allocation resource change is required, in operation S920, and when the allocation resource change is possible, the resource for the stream is changed and allocated, based on the allocation resource change information, in operation S930.

For example, when the allocation resource change information corresponds to change to the minimum resource requirement, a bridge which allocates the resource to the minimum resource requirement eliminates a need to change the resource to the minimum resource requirement, and a bridge which allocates the resource to the maximum resource requirement changes the resource for the stream from the maximum resource requirement to the minimum resource requirement, and allocates the resource.

Also, when the allocation resource change information corresponds to change to the maximum resource requirement, a bridge which allocates the resource to the maximum resource requirement eliminates a need to change the resource to the maximum resource requirement, and a bridge which allocates the resource to the minimum resource requirement checks whether change to the maximum resource requirement is possible. When change to the maximum resource requirement is possible, the bridge subsequently changes the resource for the stream from the minimum resource requirement to the maximum resource requirement, and allocates the resource.

The method of providing the QoS in the link layer according to the above-described exemplary embodiments may be recorded in computer-readable media including program instructions to implement various operations embodied by a computer. The media may also include, alone or in combination with the program instructions, data files, data structures, and the like. The media and program instructions may be those specially designed and constructed for the purposes of the present invention, or they may be of the kind well-known and available to those having skill in the computer software arts. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. The media may also be a transmission medium such as optical or metallic lines, wave guides, and the like, including a carrier wave transmitting signals specifying the program instructions, data structures, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention.

According to the present invention, there is provided a system and method of providing a QoS in a link layer which can provide the QoS for each stream in order to provide a QoS of time-sensitive traffic in the link layer.

Also, according to the present invention, there is provided a system and method of providing a QoS in a link layer which can provide the QoS for each stream in the link layer and reduce a number of resource reservation failures which may be generated in a bridge.

Also, according to the present invention, there is provided a system and method of providing a QoS in a link layer which can flexibly update an allocation resource for a stream depending on allocable resource, reduce a number of resource reservation failures, and provide a stream of good quality.

Also, according to the present invention, there is provided a system and method of providing a QoS in a link layer which can secure an allocation resource for a stream intending to receive a portion of an allocation resource for a stream under service, and to perform a service.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A method of providing a quality of service (QoS) in a link layer, the method comprising:
   receiving, by a stream providing device, minimum resource requirement information and maximum resource requirement information of a stream receiving device;
   transmitting, by the stream providing device, a reservation message including the minimum and the maximum resource requirement information;
   allocating a resource, by at least one bridge, based on the reservation message transmitted from the stream providing device; and
   receiving, by the stream receiving device, a stream transmitted from the stream providing device via the resource,
   wherein the allocating the resource comprises selecting, by the at least one bridge, to allocate the resource to either a minimum resource requirement corresponding to the minimum resource requirement information provided by the reservation message or a maximum resource requirement corresponding to the maximum resource requirement information provided by the reservation message,
   during the allocating the resource, the resource is allocated, by the at least one bridge, to the maximum resource requirement when the at least one bridge is able to allocate the resource to the maximum resource requirement and a previous bridge has not allocated the resource to the minimum resource requirement,
   the resource is allocated, by the at least one bridge, to the minimum resource requirement when the at least one bridge is not able to allocate the resource to the maximum resource requirement or the previous bridge has already allocated the resource to the minimum resource requirement, and
   wherein each of the at least one bridge allocates the resource to the minimum resource requirement after changing a resource for another stream under service from a maximum resource requirement to a minimum resource requirement and allocating the resource for the other stream if an allocable resource is less than the minimum resource requirement.

2. The method of claim 1, wherein, in the allocating the resource, bridges following any one of the at least one bridge allocate the resource to a minimum resource requirement if the any one of the at least one bridge allocates the resource to the minimum resource requirement, based on the reservation message.

3. The method of claim 2, wherein the reservation message includes a field indicating whether the minimum resource requirement is allocated, and
   the bridges following the any one of the at least one bridge allocate the resource to the minimum resource requirement if the field indicates that the minimum resource requirement is allocated.

4. The method of claim 2, wherein a bridge which allocates the resource to a maximum resource requirement of the at least one bridge changes the resource from the maximum resource requirement to the minimum resource requirement, and allocates the resource.

5. The method of claim 2, wherein a bridge which allocates the resource to the minimum resource requirement of the at least one bridge determines whether to allocate the resource to the maximum resource requirement at predetermined update intervals, changes the resource into the maximum resource requirement, and allocates the resource to the maximum resource requirement if allocation to the maximum resource requirement is possible.

6. The method of claim 1, wherein the stream providing device receives a registration message transmitted from the stream receiving device, and receives the minimum and the maximum resource requirement information via a minimum resource requirement information field and a maximum resource requirement information field additionally configured in the registration message.

7. The method of claim 1, wherein the stream providing device receives the minimum and the maximum resource requirement information via an application layer higher than the link layer.

8. The method of claim 1, further comprising:
receiving, by the stream providing device, allocation resource change information of the resource transmitted from the stream receiving device; and
changing and allocating, by each of the at least one bridge, the resource, based on the allocation resource change information.

9. The method of claim 1, wherein the allocating the resource comprises receiving, by the at least one bridge, the reservation message from the previous bridge indicating whether the previous bridge has allocated the resource to the maximum resource requirement or to the minimum resource requirement, and
if the reservation message from the previous bridge indicates that the previous bridge has allocated the resource to the maximum resource requirement and if the resource is allocated by the at least one bridge to the minimum resource requirement, transmitting, by the at least one bridge, a change request message to the previous bridge requesting the previous bridge to change a resource allocation from the maximum resource requirement to the minimum resource requirement.

10. The method of claim 1, wherein the minimum resource requirement information indicates a minimum amount of the resource to be allocated for the stream and the maximum resource requirement information indicates a maximum amount of the resource to be allocated for the stream.

11. A non-transitory computer-readable recording medium storing a program for implementing a method of providing a QoS in a link layer, the method comprising:
receiving, by a stream providing device, minimum resource requirement information and maximum resource requirement information of a Stream receiving device;
transmitting, by the stream providing device, a reservation message including the minimum and the maximum resource requirement information;
allocating a resource, by at least one bridge, based on the reservation message transmitted from the stream providing device such that the resource is allocated by selecting either a minimum resource requirement corresponding to the minimum resource requirement information provided by the reservation message or a maximum resource requirement corresponding to the maximum resource requirement information provided by the reservation message, wherein the maximum resource requirement is selected when the at least one bridge is able to allocate the resource to the maximum resource requirement and a previous bridge has not allocated the resource to the minimum resource requirement, and the minimum resource requirement is selected when the at least one bridge is not able to allocate the resource to the maximum resource requirement or the previous bridge has already allocated the resource to the minimum resource requirement; and
receiving, by the stream receiving device, a stream transmitted from the stream providing device via the resource,
wherein each of the at least one bridge allocates the resource to the minimum resource requirement after changing a resource for another stream under service from a maximum resource requirement to a minimum resource requirement and allocating the resource for the other stream if an allocable resource is less than the minimum resource requirement.

12. A system for providing a QoS in a link layer, the system comprising:
a stream providing device comprising a memory and which receives minimum resource requirement information and maximum resource requirement information of a stream receiving device, and transmits a reservation message including the minimum and the maximum resource requirement information; and
at least one bridge which allocates a resource, based on the reservation message, so that the stream providing device may provide the stream receiving device with a stream,
wherein the at least one bridge allocates the resource by selecting either a minimum resource requirement corresponding to the minimum resource requirement information provided by the reservation message or a maximum resource requirement corresponding to the maximum resource requirement information provided by the reservation message,
wherein, the at least one bridge selects to allocate the resource to the maximum resource requirement when the at least one bridge is able to allocate the resource to the maximum resource requirement and a previous bridge has not allocated the resource to the minimum resource requirement, and
the at least one bridge selects to allocate the resource to the minimum resource requirement when the at least one bridge is not able to allocate the resource to the maximum resource requirement or the previous bridge has already allocated the resource to the minimum resource requirement,
wherein each of the at least one bridge allocates the resource to the minimum resource requirement after changing a resource for another stream under service from a maximum resource requirement to a minimum resource requirement and allocating the resource for the other stream if an allocable resource is less than the minimum resource requirement.

13. The system of claim 12, wherein bridges following any one of the at least one bridge allocate the resource to a minimum resource requirement if any one of the at least one bridge allocates the resource to the minimum resource requirement, based on the reservation message.

14. The system of claim 13, wherein the reservation message includes a field indicating whether the minimum resource requirement is allocated, and
the bridges following any one of the at least one bridge allocates the resource to the minimum resource requirement if the field indicates that the minimum resource requirement is allocated.

15. The system of claim 13, wherein a bridge which allocates the resource to a maximum resource requirement of the at least one bridge changes the resource from the maximum resource requirement to the minimum resource requirement, and allocates the resource.

16. The system of claim 13, wherein a bridge which allocates the resource to the minimum resource requirement of the at least one bridge determines whether to allocate the resource to the maximum resource requirement at predetermined update intervals, changes the resource into the maximum resource requirement, and allocates the resource to the maximum resource requirement if allocation to the maximum resource requirement is possible.

17. The system of claim 12, wherein the stream providing device receives a registration message transmitted from the stream receiving device, and receives the minimum and the maximum resource requirement information via a resource requirement information field minimum and a maximum resource requirement information field additionally configured in the registration message.

18. The system of claim 12, wherein the stream providing device receives the minimum and maximum resource requirement information via an application layer higher than the link layer.

19. The system of claim 12, wherein the stream providing device receives allocation resource change information of the resource transmitted from the stream receiving device, and each of the at least one bridge changes and allocates the resource, based on the allocation resource change information.

20. The method of claim 12, wherein the at least one bridge receives the reservation message from the previous bridge including a reservation status of the previous bridge which indicates whether the previous bridge has allocated the resource to the maximum resource requirement or the minimum resource requirement, and if the reservation status from the previous bridge indicates that the previous bridge has allocated the resource to the maximum resource requirement and if the resource is allocated by the at least one bridge to the minimum resource requirement, the at least one bridge transmits a change request message to the previous bridge requesting the previous bridge to change a resource allocation from the maximum resource requirement to the minimum resource requirement.

21. The system of claim 12, wherein the minimum resource requirement information indicates a minimum amount of the resource to be allocated for the stream and the maximum resource requirement information indicates a maximum amount of the resource to be allocated for the stream.

* * * * *